US010440414B1

(12) United States Patent
Martell et al.

(10) Patent No.: US 10,440,414 B1
(45) Date of Patent: Oct. 8, 2019

(54) SYSTEMS AND METHODS OF DELIVERING EPISODIC CONTENT

(71) Applicant: Martell Broadcasting Systems, Inc., Brooklyn, NY (US)

(72) Inventors: Carey Ray Martell, San Marcos, TX (US); Akim Angelo Anastopoulo, Charleston, SC (US)

(73) Assignee: Martell Broadcasting Systems, Inc., Brooklyn, NY (US)

( * ) Notice: Subject to any disclaimer, the term of this patent is extended or adjusted under 35 U.S.C. 154(b) by 0 days.

(21) Appl. No.: 15/965,125

(22) Filed: Apr. 27, 2018

(51) Int. Cl.
*H04N 21/262* (2011.01)
*H04N 21/258* (2011.01)
*H04N 21/2187* (2011.01)

(52) U.S. Cl.
CPC ... *H04N 21/26275* (2013.01); *H04N 21/2187* (2013.01); *H04N 21/25841* (2013.01)

(58) Field of Classification Search
CPC ............. G06F 21/10; G06F 2221/0768; H04L 2463/101; H04L 63/10; H04L 63/101; H04L 63/108; H04L 63/20; H04L 12/4641; H04L 45/586; H04L 61/2007; H04N 21/222; H04N 21/2347; H04N 21/4353; H04N 21/4405; H04N 21/6125; H04N 21/64; H04N 21/64322
See application file for complete search history.

(56) References Cited

U.S. PATENT DOCUMENTS

| | | | |
|---|---|---|---|
| 8,521,899 B2 | 8/2013 | Narula | |
| 9,258,589 B2 | 2/2016 | Grouf | |
| 9,699,515 B2 | 7/2017 | Grouf | |
| 9,712,884 B2 | 7/2017 | Grouf | |
| 2009/0228920 A1 | 9/2009 | Tom | |
| 2014/0157298 A1* | 6/2014 | Murphy | H04N 21/64322 725/14 |
| 2016/0149956 A1* | 5/2016 | Birnbaum | H04L 63/101 726/1 |
| 2018/0014076 A1 | 1/2018 | Shanson | |
| 2018/0014077 A1 | 1/2018 | Hou | |

FOREIGN PATENT DOCUMENTS

| | | |
|---|---|---|
| WO | 2015123572 A1 | 8/2015 |
| WO | 2018009408 A3 | 1/2018 |

OTHER PUBLICATIONS

Martell, Carey; Martell TV—Mobile video view application; https://www.indiegogo.com/projects/martell-tv-mobile-video-view-application#/; downloaded Feb. 15, 2019.

* cited by examiner

*Primary Examiner* — Omar S Parra
(74) *Attorney, Agent, or Firm* — Lynch LLP

(57) ABSTRACT

Methods of delivering episodic content according to time zone specific schedules are disclosed. Video content is scheduled and delivered via complex interactions between clients and servers, where a service host can be used to coordinate delivery of content from a content host. It is contemplated that, in the event video content is unavailable at a scheduled time, an error message can be delivered to a client while a prompt to rectify the error condition can be delivered to a channel manager via the service host.

6 Claims, 3 Drawing Sheets

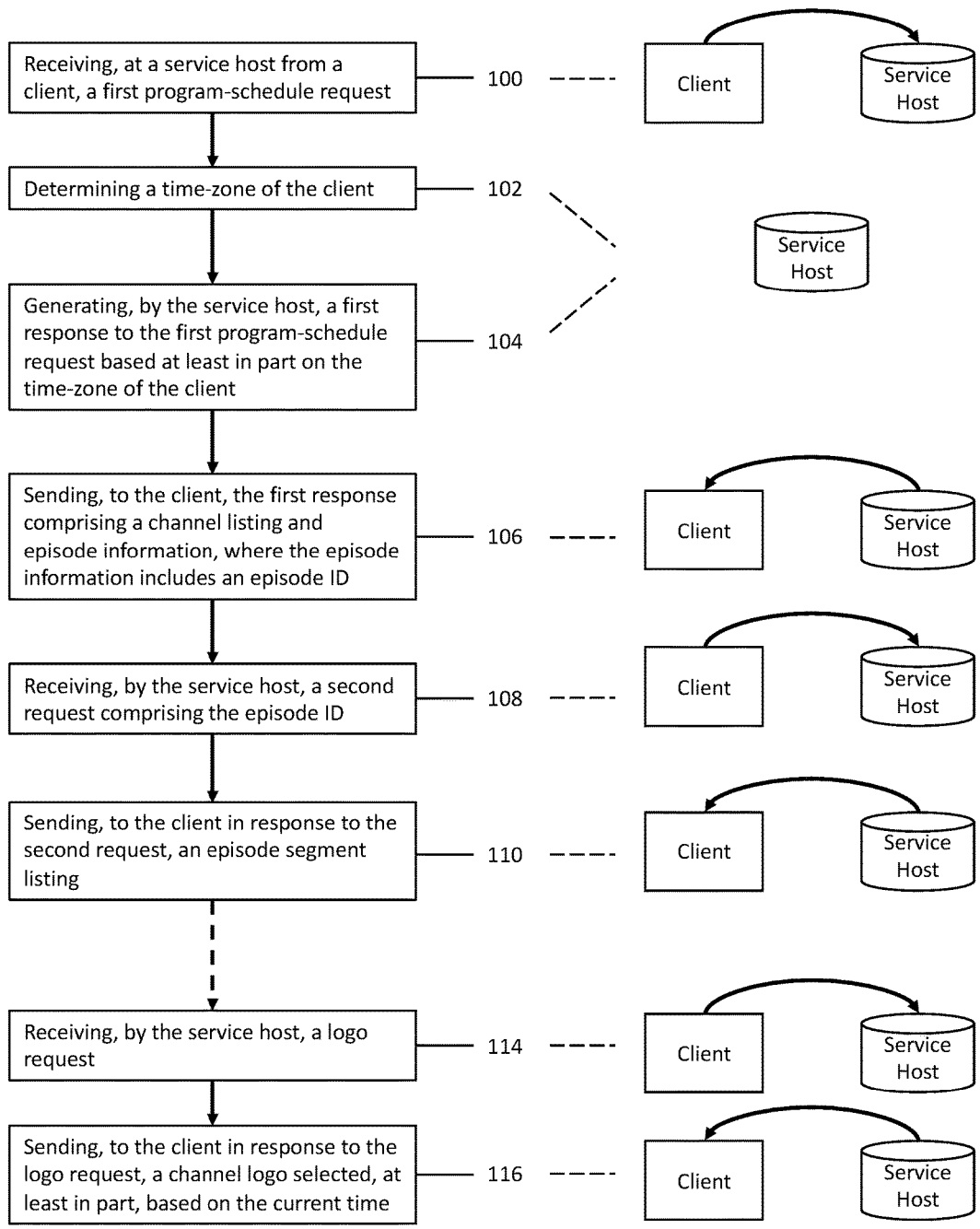
Figure 1A                    Figure 1B

SYSTEMS AND METHODS OF DELIVERING EPISODIC CONTENT

FIELD OF THE INVENTION

The field of the invention is content delivery over a network connection.

BACKGROUND

The background description includes information that may be useful in understanding the present invention. It is not an admission that any of the information provided in this application is prior art or relevant to the presently claimed invention, or that any publication specifically or implicitly referenced is prior art.

Online streaming services have risen to prominence as desirable alternatives to signing up for costly cable services. Services like Netflix provide consumers with an easy way to consume entertainment on demand. User generated content on websites like YouTube is also popular, and millions of people every day visit YouTube to consume content directly from content creators.

But online services have failed to meet a demand in the market for a cross between an on-demand service and a cable service. Consumers often miss the ability to just "turn on" a cable channel and watch whatever is being broadcast, but no service exists that can allow users to just "turn on" a channel that plays, for example, YouTube videos. Moreover, there is huge potential for ad revenue to be generated by providing a service that allows streamlined channel management to create playback schedules for episodic content.

No service currently exists that allows for the creation of custom channels with custom schedules, which can generate revenue for the channel operators as well as the content creators. Thus, there still exists a need for a service that allows streamlined channel management to set schedules of content that can be viewed by others.

SUMMARY OF THE INVENTION

The present invention provides apparatus, systems, and methods in which content (e.g., video) is scheduled and delivered over one or more network connections.

In one aspect of the inventive subject matter, a computer-implemented method of delivering episodic content is contemplated. The method comprises the steps of: receiving, at a service host from a client associated with a client IP address, a first program-schedule request; determining a time-zone of the client based on the client IP address; generating, by the service host, a first response to the first program-schedule request based at least in part on the time-zone of the client; sending, to the client, the first response, wherein the first response comprises a channel listing comprising a list of channels, wherein each channel from the list of channels comprises a channel ID; wherein the first response further comprises episode information, the episode information comprising a URL, an episode ID, and a show ID; receiving, by the service host, a second request comprising the episode ID; and sending, to the client in response to the second request, an episode segment listing, wherein each segment in the episode segment listing comprises a duration and a video ID.

In some embodiments, each channel of the channel listing further comprises an isFeatured attribute, an isPremium attribute, an isRecommended attribute, a logo identifier, a name, a shortName, a channel listing color, a tagType, and an episode listing. In some embodiments, the episode information further comprises a category color, the duration, an image, an isLive attribute, a name, an onDemand attribute, a time slot, and a show name. In some embodiments, each segment in the episode segment listing further comprises an author, an image, and a name.

It is contemplated that methods can include the additional steps of: receiving, by the service host, a third request comprising the channel ID and a current time in the client's time zone; and sending, to the client in response to the third request, a channel logo selected, at least in part, based on the current time. Additionally, the step of receiving, by the service host, analytics data comprising the episode ID and an amount of time the client has played video content can also be included in some embodiments.

In some embodiments, methods of the inventive subject matter can additionally include the steps of: receiving, at a service host from a second client associated with a second client IP address, a second program-schedule request; determining a second time-zone of the second client based on the second client IP address; generating, by the service host, a third response to the second program-schedule request based at least in part on the second time-zone of the second client; and sending, to the second client, the third response, wherein the third response comprises a second channel listing wherein the second channel listing is different from the channel listing.

In another aspect of the inventive subject matter, a computer-implemented method of delivering episodic content is contemplated, the method comprising the steps of: receiving, by a service host, a request comprising an episode ID that corresponds to an episode comprising a number of segments; sending, from the service host to a client, an episode segment listing, wherein each segment in the episode segment listing comprises a segment ID, a URL, and a video ID; determining a current segment index based on an elapsed time since the release time of the episode; setting a current segment from the number of segments, wherein the current segment corresponds to the current segment index in the episode segment listing, and, if the current segment index is greater than the number of segments, setting the current segment to a default error segment and dispatching a first error handling alert to a channel operator; verifying, by the service host, whether the current segment is unavailable; and upon determining that the current segment is unavailable, setting the current segment to the default error segment and dispatching a second error handling alert to the channel operator.

In some embodiments, the episode segment listing further comprises an author, a duration, an image, a name, and a type.

One should appreciate that the disclosed subject matter provides many advantageous technical effects including coordination of error message delivery with an accompanying message to a channel operator, time-zone-based scheduling, and delivery of streaming episodic content that is hosted on a server other than a service host.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 1A is a flow chart of an embodiment of the inventive subject matter.

FIG. 1B shows request and response flow between a client and a server for the flow chart of FIG. 1A.

DETAILED DESCRIPTION

Figures 2A, 2B:
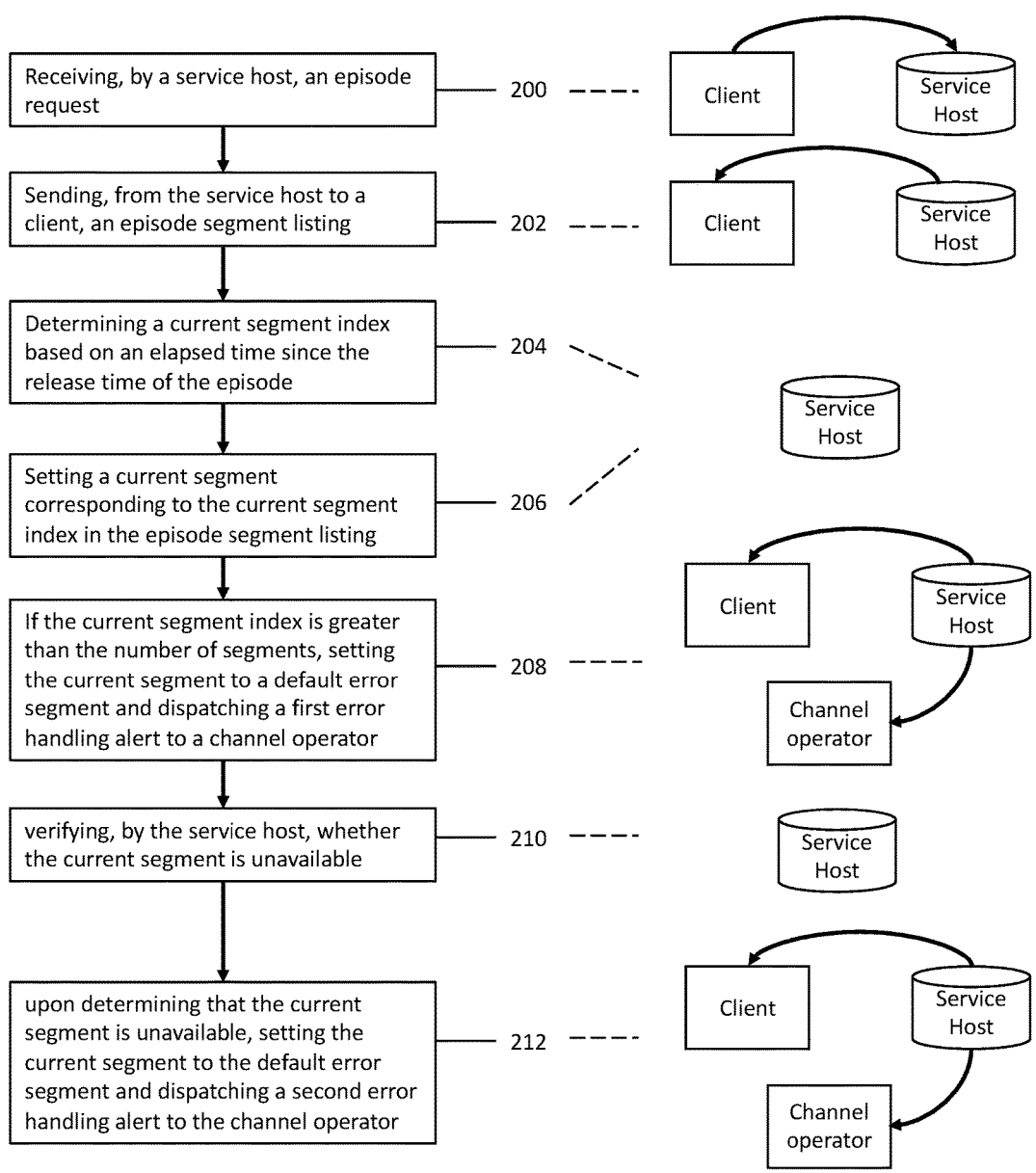
FIG. 2A is a flow chart of another embodiment of the inventive subject matter.
FIG. 2B shows request and response flow between a client and a server for the flow chart of FIG. 2A.

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be noted that any language directed to a computer should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. The following description includes information that may be useful in understanding the present invention. It is not an admission that any of the information provided in this application is prior art or relevant to the presently claimed invention, or that any publication specifically or implicitly referenced is prior art.

Throughout this application, the term "array" is used. "Array" should be interpreted to mean any data structure—either known or discovered in the future—that is capable of storing the data or information that an array is described as being able to store. A linked list, for example, is included in this definition of "array." All attributes in this application, unless otherwise stated, should be interpreted as comprising either a single attribute or an array of attributes.

In methods of the inventive subject matter, video content is available for consumption as "episodes." An episode can comprise one or more "segments," where a segment can be a video that is streamed from, for example, YouTube (or any other content host). A length of time that a segment requires depends on the duration of the video that creates that segment.

It is contemplated that many of the features and attributes discussed in this application can be applied to or used in all embodiments of the inventive subject matter described in this application, regardless of what embodiment is discussed. For example, when an "episode ID" is described in one embodiment, it is intended to be the same attribute when used to describe features or attributes of another embodiment. The same is true for all of the subject matter described in this application unless explicitly stated otherwise.

The inventive subject matter is directed to the delivery of episodic content from one or more servers to a client computer in the form of streaming video according to a schedule. Delivery of content is orchestrated by interactions between a client computer, a service host (e.g., a server or cloud servers), and, sometimes, a content host. It is contemplated that, in some embodiments, the service host can also be the content host (e.g., content to be streamed is hosted on the service host).

Systems and methods of the inventive subject matter are implemented to facilitate the use of a service that allows for client computers to access streaming content online. Embodiments of the inventive subject matter allow for organization of streaming content into channels, where each channel has a schedule. Channels can be manually operated, where a channel manager organizes a channel's schedule. Each schedule has time slots, and episodes are assigned to time slots by the channel manager. As mentioned above, episodes can include one or more segments, where segments can be hosted online by third-party services, such as YouTube, Vimeo, and the like. Channel managers then create channel schedules using embedded streaming content that is organized into episodes.

It is contemplated that schedules for each channel can be time-zone specific. For example, a channel could be set so that episode A airs at 6 pm Pacific, while episode B airs at 6 pm Eastern. With a channel created and a schedule filled out by a channel manager, users of the service watch those channels according to their local time zone. Systems and methods contemplated in this application are directed to aspects of the contemplated service.

Figure 3:
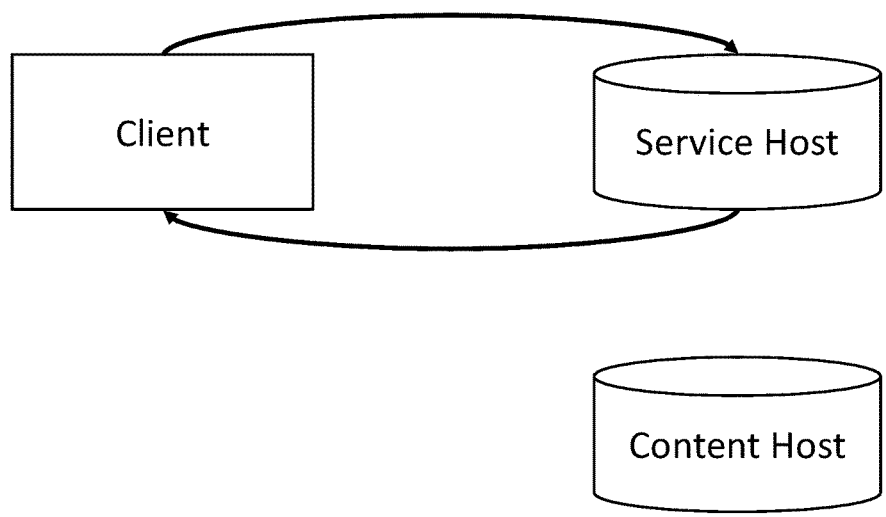
FIG. 3 shows, generally, how requests and responses flow between a client and a service host.
Figure 4:
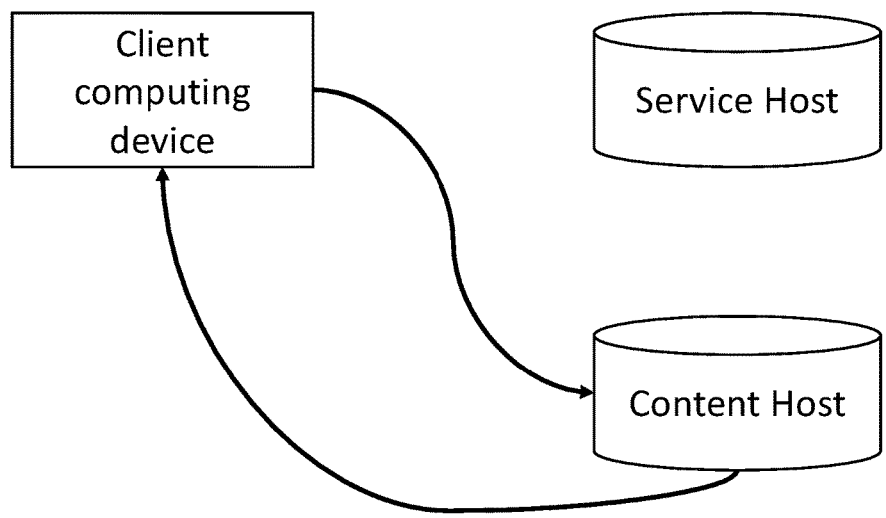
FIG. 4 shows, generally, how requests and responses flow between a client and a content host.

Methods of the inventive subject matter involve sending and receiving requests and responses to and from a client computer and a service host, and, in some embodiments, to and from a client computer and a content host. These interactions are shown in FIGS. 1B & 2B adjacent to corresponding flow charts describing details of those interactions shown in FIGS. 1A & 2A. FIGS. 3 and 4 show generically how a client interacts with a service host and with a content host to exchange information in the course of the interactions described in FIGS. 1A-2B.

It is contemplated that, in some embodiments, the content host and the service host are run on the same server or set of servers, while in other embodiments, the content host and the service host are run on different servers or sets of servers, which may be under different control or ownership. "Client" has its ordinary meaning; i.e., it refers to a client computer or computing device having a network connection capable of facilitating a connection to a host (e.g., a service host and a content host). The terms "service host" and "content host" also both have ordinary meaning; i.e., they are both intended to refer to networked computing devices such as servers (e.g., cloud servers).

FIG. 1A is a flow chart corresponding to a method of the inventive subject matter, whereby requests and responses are transmitted between a client and a service host to coordinate delivery of content from a content host to the client according to time-zone information.

It is contemplated that for any embodiment of the inventive subject matter, a client can send a request to a service host, which includes information sufficient to initiate authentication. The service host can then authenticate the client and send a response comprising information and attributes necessary to facilitate methods described in this application. A second request from the client to the server, after authentication, can then provide updated attribute values and information to the service host. In response to the second request, the service can update the information and attributes stored on the service that are sent to clients. These steps can take place at any point in methods of the inventive subject matter involving attributes and attribute values.

In the embodiment shown in FIGS. 1A & 1B, the first step 100 of the method is to receive, from a client, a program-schedule request comprising an associated client IP address or other metadata sufficient to determine a location of the client. In step 102, the client's time-zone is determined. It is contemplated that time zone can be determined using the requester's IP address or other extrinsic information, rather than explicitly including time-zone information in the request. Methods of determining a location based on an IP address are well known in the art. Determining or approximating a time-zone based on a determined location is also well known in the art. The service host then generates a response to the program-schedule request, as demonstrated in the second step 104. The response to the program-schedule request is based, at least in part, on the time-zone information corresponding to the client, as discussed above. The response comprises information about a program schedule, which comprises data stored on the host service. A program schedule includes, for example, information about what time episodes are scheduled to air on a channel, on a per-time-zone basis. Time-zone information corresponding to the client, as determined by the host as described above, can be used by the host so that in embodiments where the channel has different program schedules according to different time zones, the correct program schedule can be delivered to the client (or so that the client can receive the program schedule and access the correct content according to local time of the client).

It is also contemplated that the program-schedule request can include information about the user that is sending the request to the service host, such as unique identifying information or session data to determine a user. The service host can use this information to determine, based on the user-identifying information, what, if any, premium packages the user has access to. This method is superior to, for example, permitting a user to directly send information about premium content package access because client-side data is easier for a client to manipulate to gain unauthorized access to premium content.

Thus, the response generated by the service host takes into account the client's local time zone when generating the response so that content can be delivered to that client based on that client's local time zone.

In step 106, the service host sends the response to the client. The response has a channel listing that includes a list of channels. Each channel from the list of channels comprises a set of attributes, which can include all or some subset of the following: a channel ID, an isFeatured attribute, an isPremium attribute, an isRecommended attribute, a logo identifier, a name, a shortName, a channel listing color, a tagType, and an episode listing. It is contemplated that, in this application, a "subset" can include a single item from a list.

A channel ID identifies a channel as understood by the service host, which can store many different channels. The channel ID can be, for example, a UUID (universal unique ID). Each channel stored on the service host must have a unique channel ID according to the service host, even if it is not universally unique.

An isFeatured attribute can be a binary attribute, where it is either set to on or off (or true/false, etc.). For example, if a channel is intended to be a featured channel, then the isFeatured attribute can be set to "on," and if the channel is not intended to be a featured channel, then the isFeatured attribute can be set to "off." Whether a channel is featured can be determined by a service host manager, or by a channel manager. A method of changing the isFeatured attribute on the server is now described. In some embodiments, as described more generally above, in a request from a client to the server, the client can include authentication credentials associated with an authorized user. After receiving the request, the server sends to the client the channel listing, including the isFeatured attribute for a channel. A second request from the client to the server, after authentication, provides an updated isFeatured attribute value and a channel ID to the server. In response to the second request, the server updates the isFeatured attribute associated with the channel ID. In some embodiments, the isFeatured attribute has more than two conditions, which can be used to distinguish between different types of "featured" content. It is contemplated that the isFeatured attribute can be set based on information in the program-schedule request.

An isPremium attribute is also contemplated as being a binary attribute, where it is either set to on or off. For example, if a channel is intended to be a premium channel, then the isPremium attribute value can be set to "on," and if the channel is not intended to be a premium channel, then the isPremium attribute value can be set to "off." Whether a channel is a premium channel can be determined by a service host manager, or by a channel manager. It is also contemplated that an isPremium attribute can be non-binary, and instead the attribute can indicate whether a channel belongs to a premium package, and if so, which premium package it belongs to.

Access to a channel can be restricted based on the setting of the isPremium attribute. If a user attempting to access a channel has not paid for a particular premium package, and the isPremium attribute indicates that a channel belongs to that particular premium package, then the user can be denied access based on the isPremium attribute by, for example, the server refusing to provide associated channel, show, or episode information with a response to a request by a client for a channel, show, or episode. To determine whether a client should be granted access to a channel based on the isPremium attribute, the service host can make a determination based on a client's identity and what premium packages each client has paid for, which may be stored with information associated with the client. When a client authenticates with a service host, the service host can then make a determination about what channels the client can access when a request is made. In some embodiments, the service host stores one or more lists of clients where each client has an associated indicator of granted access to a channel marked as premium by an isPremium attribute. For example, the service host can compare whether a client should be allowed access based on the identity of the client, and if the client is not allowed access (e.g., for a particular premium channel or premium package, the client's isPremium attribute is "false" when it needs to be "true"), the client can display an alert that access has been denied to a channel because a premium package is necessary for access.

It is contemplated that many different premium packages can be set up by, for example, a service manager or a channel manager, where each different premium package corresponds to a channel or list of channels. When a service host receives information indicating a user has paid for a particular premium package, the service host then updates corresponding channel access information in the user's account information to include the list of channel IDs associated with the channel or list of channels in the premium package. It is contemplated that the isPremium attribute can be set based on information in the program-schedule request.

An isRecommended attribute is contemplated as being a binary attribute, where it is either set to on or off. For example, if a channel is intended to be recommended to a particular user, then the isRecommended attribute can be set to "on," and if the channel is not intended to be recommended to a particular user, then the isRecommended attribute can be set to "off." Whether a channel is featured can be determined by a service host manager, or by a channel manager.

It is also contemplated that the isRecommended attribute can alternatively be non-binary. In some embodiments, the isRecommended attribute that is returned in the response to the program-schedule request can indicate a class of users (e.g., based on a subscription tier or user preferences) that will interpret the isRecommended attribute as recommending content or a channel.

A response to a program-schedule request can additionally include a logo identifier, based on the channel that the client is attempting to access, as identified in the program-schedule request that is sent from the client to the service host. A logo can be set for a channel by a channel manager, or in some embodiments by a service manager. It is contemplated that the logo for a particular channel can be static, or it can change based on the time of day. A logo for a channel can additionally be either a static image, or an animated image.

A name attribute that is returned in the response to the program-schedule request is a string or equivalent and can be as basic as a written-language identifier of a channel (e.g., American West, WWII History, or Reality TV). It is contemplated that the name attribute can also be or be part of an array that includes the names of several channels.

In instances where the name that is returned in the response to the program-schedule request is longer than a threshold length (e.g., longer than 6-10 characters), it may be undesirable for a client to display the name. If the client determines the name is longer than a threshold length, then it displays the shortName instead. While a shortName can be returned even if the name that is returned in the response is shorter than the threshold amount, when the name is longer, the shortName attribute can conveniently indicate the name of, e.g., the channel or episode (or segment(s) within an episode) that is returned. It is contemplated that the shortName attribute can be an array of shortened names.

A channel color attribute associated with a channel can also be returned in the response to the program-schedule request. The channel listing color attribute can be, for example, a hex color code or an RGB color code. The client uses the channel color attribute to display the color defined by the channel color attribute with the channel to the user.

A tagType attribute can be included in the response to the program-schedule request. In some embodiments, channels are given tags that help to categorize or identify the channels. For example, a channel can be tagged as being for children, it can be tagged as containing explicit content, or it can be tagged as being a channel that primarily includes documentary series. The tagType attribute can comprise one or more tags (e.g., in an array) that all pertain to a channel that is subject to a program-schedule request.

A response to a program-schedule request can also include an episode listing attribute. An episode listing attribute can include information identifying one or an array of episodes that are schedule to air on the channel that is the subject of the request. In some embodiments, an array of episodes can additionally include the scheduled air times for each episode contained in the array of episodes.

It is contemplated that a channel request is also possible. A channel request from the client to the service host includes a channel ID. The service host responds to the channel request with a similar response as for a program schedule request. Instead of including, in the response, all channel information (and, in some embodiments, only those channels associated with a particular time zone), the service host instead responds with channel information only for the channel associated with the channel ID in the request. In some embodiments, if the service host determines that the user is not authorized to access the channel, the associated channel information is not provided in the response, which instead includes information indicating the user is not authorized to access the channel. In some embodiments, the response to a channel request includes a program schedule for the channel for all time slots for a particular day or window of time (e.g., the next 12 or 24 hours of program scheduling for a channel), which can additionally include scheduling information about episodes that have played on that channel before the time of the response).

It is contemplated that an episode listing attribute can include additional episode information. Episode information can include: a category color, a duration, a URL, an episode ID, an image, an isLive attribute, a name, an onDemand attribute, a time slot, a show ID, and a show name.

A category color within the episode listing attribute can be used to identify categories for episodes within the episode listing attribute. Episodes or episode information that is included in the episode listing attribute can be associated with a color based on the category of the episode. For example, an episode that is directed to history can associated with a first color, while an episode directed to reality television can be associated with a second color.

A duration can include a total runtime of an episode. It is also contemplated that a duration can include a remaining runtime of an episode, in the event the program-watch request is sent to the service host in the middle of a time slot for a particular episode. Thus, for example, if 15 minutes of a 30-minute timeslot has already elapsed by the time a program-schedule request is received at the service host, and the episode assigned to that timeslot is 30 minutes long, then the duration would be set to 15 minutes (i.e., the remaining time).

A URL that is included with a response to a program-schedule request can correspond to an episode in a variety of ways. In some embodiments, a URL comprises an address (e.g., a URL, IP address, or other location-identifying address that can be used by a network-connected computing device) for a user to access a particular episode associated with the service host. If the client requests this URL, an additional episode request is generated corresponding to the episode ID, as described below.

An episode ID comprises a unique identifier for an episode on a channel. In some embodiments, the episode ID corresponds to an episode where an episode comprises an array of episode segments. Each episode segment is associated with a video (e.g., a YouTube video), where multiple episode segments put together make up an episode. Thus, when a client sends an episode request comprising the episode ID, the service host responds with episode information including the list of episode segments that are included in the episode corresponding to that episode ID. Each episode segment has both a segment ID and a content ID, where the segment ID is unique to that segment and the content ID corresponds to an identifier that is specific to the content host on which the segment is hosted (e.g., a YouTube specific identifier).

The episode ID can be assigned to an episode by the service host. It is contemplated that an episode ID can be a UUID, although this is not required, and the episode ID can alternatively take on a form that can uniquely identify an episode within the service host without being universally unique.

An image name can also be included in the episode information. An image name corresponds to a resource located on the service host that, when the client sends an image request comprising the image name, the service host responds with an image associated with the image name. The image can be a screengrab from the episode corresponding to the episode information. In some embodiments, an image corresponding to the episode information can be a logo or another image like a splash screen that corresponds to that episode that is not taken from the episode itself. This can be useful to avoid spoilers.

Episode information can also include an isLive attribute. An isLive attribute can indicate whether an episode having the corresponding episode information is a live broadcast. The isLive attribute can be a binary identifier, though this is not a requirement, so long as the isLive attribute contains sufficient information to identify whether an episode is live.

A name attribute in the episode information can be a written-language identifier of an episode (e.g., an episode title). In some embodiments, the name can include additional information about an episode (e.g., "s03e15"), or a shorthand name for an episode. It is contemplated that the name attribute can also be an array that includes the names of several episodes, such as the episode that immediately follows whatever episode is playing in a timeslot at the time that the program-schedule request is received by the service host.

The episode information can also include an onDemand attribute. The onDemand attribute can indicate whether an episode is available on an "on demand" basis. An episode is available "on demand" if it is, for example, available at whatever time it is requested, or if it is available only after paying a fee. The onDemand attribute can be, for example, a binary indicator of whether an episode is available on an onDemand basis.

A time slot attribute can also be included in the episode information. A time slot attribute can indicate the time slot that an episode belongs to, where the time slot is defined by a span of time according to the client's local time zone. It is contemplated that the time slot attribute can additionally or alternatively be defined according to an absolute measurement of time (e.g., Greenwich Mean Time) that can be mapped into a client's local time zone.

Episode information can also include a show ID (e.g., one or an array of show IDs). A show ID can identify, for example, that an episode or segment belongs to a show (e.g., "Lost" being a show having episodes that make up the show). For example, if the episode or segment corresponding to the episode information that is requested belongs to the show Lost, then the show Lost would have a corresponding show ID. The show ID can be a UUID, or, in some embodiments, the show ID can be a short identifier that is unique to that show and is not necessarily a UUID.

Finally, episode information can include a show name. A show name, similar to the example given above, relates to the name of a show that is delivered episodically. Using the example above, a show name would be something like "Lost" or "Party of Five."

It is contemplated that steps 100-106 can be completed for more than one client, either in sequence or in parallel, in the course of executing a method of the inventive subject matter.

As shown in step 108, the service host receives a preview request from the client that includes the episode ID and can also include the show ID. If the episode ID is a UUID or other internally globally unique ID, the preview request may include only the episode ID. The preview request thus identifies for the service host that the client is requesting a particular episode of a particular show, where each is identified by episode ID and show ID, respectively. Once the service host has an episode ID and a show ID, it can perform a data lookup to collect information that can be sent in a response to the client.

It is contemplated that, in some embodiments, the following steps can be included. In response to the request described in step 108, the service host can send to the client a response that includes episode preview information. Episode preview information can include all or some of the following: an episode description, an episode name, an episode TV rating, the show ID, a show image attribute, and the show name.

The episode description can include a brief synopsis of the episode. The episode name is the name of the particular episode of the show. The episode TV rating can be a rating requested from, for example, a third-party review aggregator website (e.g., Rotten Tomatoes or Metacritic), or it can be a proprietary rating that is stored in a database on the service host or a server that is operated by the service host. The show ID is the same as described above. The show image attribute, if defined, corresponds to a resource located on the service host that, when the client sends an image request comprising the show image attribute, the service host responds with an image associated with the show image attribute. Optionally, a show image properties attribute can be used to convey information about a show image (e.g., it can be an image related to a show, but not necessarily related to a particular episode of a show), such as resolution, compression format, etc. Finally, this response can include the show's name to identify what show the currently airing episode belongs to.

The episode request includes the episode ID, which is described in detail above. A client will send an episode request when, for example, a user selects an episode displayed by the client in a digital program guide after receiving a response to the program-schedule request.

In response to the preview request, as shown in step 110 (or in response to an episode request as described in the optional step above), the service host sends to the client an episode segment listing corresponding to the episode ID. An episode segment listing includes an array of episode segments, i.e., the information corresponding to each segment identified in the episode segment listing. Each segment included (e.g., identified) in the episode segment listing can include all or some of the following: an author, a duration, a segment ID, an image, a name, a type, a URL, and a video ID.

An author attribute can include information sufficient to identify the author of a segment. Similar to the attribute described above, a duration attribute can include a total runtime of a segment. A duration attribute that can be included in an episode segment listing can be the same as, different from, or include overlapping information that is in a duration attribute contained in the episode listing attribute (e.g., if an episode comprises a single episode segment, the episode duration and episode segment duration may be the same).

An episode segment can include a segment ID. A segment ID identifies a particular segment and can be a UUID or other identifier. This allows the server to distinguish between different segments contained in an episode segment listing.

An episode segment can also include an image. As described above, an image attribute, if defined, corresponds to a resource located on the service host that, when the client sends an image request comprising the show image attribute, the service host responds with an image associated with the show image attribute. The image associated with the image attribute can be a screengrab from a show. In some embodiments, an image that is part of the episode information can be, for example, a logo or a splash screen that corresponds to a segment, where the image or splash screen is not taken from the segment itself. This can be useful to avoid spoilers.

An episode segment can also include a name, a string which may comprise a type identifier that helps to identify what type of episode segment it is (e.g., a half-slot episode or a full-slot episode where a half-slot episode first into half of a 30-minute episode slot). It can additionally or alternatively include information about the segment, for example, what season a segment belongs to and what show a segment belongs to and a title of the segment (e.g., "Gaffy and Friends Season 1 Episode 2"), or a name associated with video corresponding to the episode segment hosted by a third-party service.

An episode segment listing can also include a video ID for each segment in the listing. The video ID is an identifier associated with video content hosted on a server that, when sent to the server with a video request, the server will respond with the associated video content. In embodiments where video content is hosted outside of the service host, a video ID can include an identifier that is particular to the service that hosts the video content. For example, YouTube has identifiers for every video hosted on its servers, where YouTube video IDs are specific to YouTube and ensure that each video hosted on YouTube can be identified among all other YouTube videos. It is contemplated that a video ID can, in some embodiments, be a UUID, although this is not required, and in fact is prohibited when the video ID may correspond to a third-party service that does not use UUIDs. The video ID can thus be determined from the content host.

Steps 114 & 116 are included in some embodiments. In method step 114, the service host receives a logo request from the client, where the logo request includes a channel ID and, optionally, time-zone information (e.g., the client's local time). (Alternatively, time-zone information may be determined using an IP address associated with the client's connection to the service host, as described earlier in this application.) A user may cause a client to initiate a logo request by, for example, clicking a preview button associated with a channel on the digital program guide displayed in response to a program-schedule request. By identifying a channel using the channel ID and time-zone information, the service host can receive the request and determine which channel's logo is being requested at what time, so that it can send, to the client as a response, a channel logo, as shown in step 116. In some embodiments, the channel logo can differ at least in part depending on the client's current time. For example, a channel may have a different logo during its regularly scheduled daytime programming than during its primetime, evening, or late-night programming.

In some embodiments, the service host can then receive, from the client, analytics data comprising the episode ID and the amount of time that the video has was played by the client. This information can be collected from multiple clients by the service host to determine metrics that, for example, indicate popularity of a show or total hours of a show that are viewed.

In another aspect of the inventive subject matter, a method of determining whether an error message should be delivered to a client is contemplated. An embodiment of such a method is described in the following paragraphs with relation to FIGS. 2A & 2B.

As shown in step 200, the service host receives an episode request from a client, where the episode request includes an episode ID corresponding to a particular episode. For example, the episode ID can correspond to an episode that is scheduled to air during a particular time slot, according to the client's local time zone.

Next, as shown in step 202, an episode segment listing, as described above, is sent from the service host to a client. Each segment in the episode segment listing includes all or some subset of the following: an author, a duration, an ID, an image, a name, a type, a URL, and a video ID. Each of these attributes is described above in detail.

A current segment index is then determined based on an elapsed time since the start time of the episode, as shown in step 204. This step can be completed either by the client or the service host. The current segment index identifies (e.g., numerically) which segment of an episode is currently playing. In some instances, an episode's timeslot can accommodate more segments than exist in a particular episode. When that is the case, and a client attempts to access a segment that doesn't exist, an error condition is triggered, as described below.

With the current segment index determined, a current segment corresponding to the current segment index in the episode segment listing is set (e.g., by the service host), as shown in step 206. The current segment index identifies which segment of a timeslot should be accessed based at least on the client's current time, the begin time of a timeslot, and the durations of episode segments within an episode. For example, if an episode has four segments, and the episode should—based on the current time in the client's location—be playing the second segment, then the current episode index would be determined to be to "2" because the current time, when compared to the start time, indicates that a time elapsed is greater than the duration of the first episode segment and less than the duration of the first and second episode segments. Other methods of computing the current segment index are also apparent to those skilled in the art. If the current segment index is greater than the number of segments in an episode, but the current time is less than the end time of an episode, then the service host sets the current segment to a default error segment and dispatches an error handling alert to a channel operator (e.g., an alert prompting the operator to take action to fix the error condition), as shown in step 208.

In practice, the result of these steps is that, for example, if a client attempts to watch an episode that is assigned to a 30-minute time slot, but the episode has sufficient segments to fill only 20 minutes, then the client attempting to watch that episode at the 25-minute mark will receive an error message (e.g., a video or an image containing an error message) because the current segment index will be greater than the total number of segments in an episode.

If a segment corresponds to the current time, as described above, the client can request the video content associated with the segment using a segment URL associated with the segment. At times, e.g. because a third-party service has removed the content corresponding to the segment URL, the client's request using the segment URL will result in a determination that the content associated with the URL is unavailable. When the client determines that content is unavailable, the client sends an unavailability notification to the service host comprising the segment ID and (or alternatively) the segment URL. In response to the unavailability notification, the service host verifies the content is no longer available at the segment URL by initiating a request using the segment URL (which may be determined by a segment URL in the client request or determined by the segment ID in the client request).

In some embodiments, e.g., when the service host and content host are the same, the service host may verify that content is no longer available, as shown in step 210. This can be accomplished by querying internally using the segment ID. In some embodiments, the service host may determine content unavailability not in response to an unavailability notification, but in response to another event, such as regularly scheduled software, or an episode request including the list of segments. If the service host determines that video for an episode segment is unavailable, the service host sets video associated with the episode segment to the default error segment and dispatches an error handling alert to a channel operator, as shown in step 212. In some embodiments, if the client determines that video for a requested episode segment is unavailable but that the service host has not indicated is unavailable, the client requests a default error segment to be requested from the content host.

After step 212, the channel operator that has received an error handling alert is then given an opportunity to fix the condition that lead to receiving the alert. The channel operator can, for example, select a new segment (e.g., a filler video) by updating episode information or episode segment information associated with the error through update request (s) to the server, as described earlier in this application. Through these update requests, the conditions that led to transmission of the error handling alert are rectified, and thereby reducing errors.

Interactions between a client and a server are described in this application as requests and responses that are transmitted back and forth. These requests and responses involve transmission of data that is shown visually with arrows pointing between a "client" and a "service host" or a "client" and a "content host" as shown in FIGS. 1A, 2A as well as more generally in FIGS. 3 and 4. In some instances, an interaction between a first computing device and second computing device can take place via a third computing device that route traffic. Although these interactions may not be explicitly described in this application, it is nevertheless contemplated that information passing from one device to another may be routed through an intermediary device without deviating from the inventive concepts described in this application and without explicitly contemplating what that intermediary device may be.

Thus, specific compositions and methods of episodic content delivery have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A computer-implemented method of delivering episodic content, comprising:
   receiving, at a service host from a client associated with a client IP address, a first program-schedule request;
   determining a time-zone of the client based on the client IP address;
   generating, by the service host, a first response to the first program-schedule request based at least in part on the time-zone of the client;
   sending, to the client, the first response, wherein the first response comprises a channel listing comprising a list of channels, wherein each channel from the list of channels comprises a channel ID;
   wherein the first response further comprises episode information, the episode information comprising a URL, an episode ID, and a show ID;
   receiving, by the service host, a second request comprising the episode ID; sending, to the client in response to the second request, an episode segment listing, wherein each segment in the episode segment listing comprises a duration and a video ID;
   receiving, by the service host, a third request comprising the channel ID and a current time in the client's time zone; and
   sending, to the client in response to the third request, a channel logo selected, at least in part, based on the current time.

2. The method of claim 1, wherein each channel of the channel listing further comprises an isFeatured attribute, an isPremium attribute, an isRecommended attribute, a logo identifier, a name, a shortName, a channel listing color, a tagType, and an episode listing.

3. The method of claim 1, wherein the episode information further comprises a category color, the duration, an image, an isLive attribute, a name, an onDemand attribute, a time slot, and a show name.

4. The method of claim 1, wherein each segment in the episode segment listing further comprises an author, an image, and a name.

5. The method of claim 1, further comprising the step of receiving, by the service host, analytics data comprising the episode ID and an amount of time the client has played video content.

6. A computer-implemented method of delivering episodic content, comprising:
   receiving, at a service host from a client associated with a client IP address, a first program-schedule request;

determining a time-zone of the client based on the client IP address;

generating, by the service host, a first response to the first program-schedule request based at least in part on the time-zone of the client;

sending, to the client, the first response, wherein the first response comprises a channel listing comprising a list of channels, wherein each channel from the list of channels comprises a channel ID;

wherein the first response further comprises episode information, the episode information comprising a URL, an episode ID, and a show ID;

receiving, by the service host, a second request comprising the episode ID;

sending, to the client in response to the second request, an episode segment listing, wherein each segment in the episode segment listing comprises a duration and a video ID;

receiving, at a service host from a second client associated with a second client IP address, a second program-schedule request;

determining a second time-zone of the second client based on the second client IP address;

generating, by the service host, a third response to the second program-schedule request based at least in part on the second time-zone of the second client; and sending, to the second client, the third response, wherein the third response comprises a second channel listing wherein the second channel listing is different from the channel listing.

* * * * *